US012619442B2

(12) United States Patent
Yang

(10) Patent No.: US 12,619,442 B2
(45) Date of Patent: May 5, 2026

(54) DEMO APPLICATION DOWNLOADED THROUGH CONNECTION COMPRISES OPERATING-SYSTEM-TYPE PROGRAM CORRESPONDING TO DEMO PROGRAM IDENTITY CODE

(71) Applicant: Acer Incorporated, New Taipei City (TW)

(72) Inventor: Chun-Kuo Yang, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 188 days.

(21) Appl. No.: 18/217,847

(22) Filed: Jul. 3, 2023

(65) Prior Publication Data

US 2024/0012654 A1    Jan. 11, 2024

(30) Foreign Application Priority Data

Jul. 8, 2022    (TW) ................................. 111125684

(51) Int. Cl.
*G06F 9/4401* (2018.01)
*G06F 9/445* (2018.01)

(52) U.S. Cl.
CPC ........ *G06F 9/4406* (2013.01); *G06F 9/44505* (2013.01)

(58) Field of Classification Search
CPC ... G06F 9/4406; G06F 9/44505; G06F 9/4401
See application file for complete search history.

(56) References Cited

U.S. PATENT DOCUMENTS

| | | | | | |
|---|---|---|---|---|---|
| 8,990,360 | B2 * | 3/2015 | Lang | ...................... | H04L 41/22 |
| | | | | | 709/223 |
| 9,171,314 | B2 * | 10/2015 | Greenbaum | ........... | G06Q 30/02 |
| 9,460,631 | B2 * | 10/2016 | Reilly | .................. | H04N 21/436 |
| 12,039,626 | B2 * | 7/2024 | Glen | ......................... | G06T 1/20 |

(Continued)

FOREIGN PATENT DOCUMENTS

| | | |
|---|---|---|
| CN | 1690964 A | 11/2005 |
| CN | 101794235 A | 8/2010 |

(Continued)

OTHER PUBLICATIONS

Taiwanese Office Action and Search Report for Taiwanese Application No. 111125684, dated Mar. 27, 2024.

*Primary Examiner* — Tammara R Peyton
(74) *Attorney, Agent, or Firm* — Birch, Stewart, Kolasch & Birch, LLP

(57) ABSTRACT

An electronic device including a communication module, a memory and a basic input/output system (BIOS) is provided. The communication module is configured to establish a connection between a server and the communication module. The memory is configured to store a demo application program downloaded through the connection. The demo application program includes an operating-system-like program and a demo program, wherein the demo application program corresponds to a demo program ID code. The BIOS is configured to transmit the demo program ID code to the server and boot the operating-system-like program, wherein the operating-system-like program executes the demo program.

14 Claims, 1 Drawing Sheet

(56)                    References Cited

U.S. PATENT DOCUMENTS

2010/0255813 A1 * 10/2010 Belrose ................. H04W 12/48
                                                     455/411
2010/0333081 A1 * 12/2010 Etchegoyen ............. G06F 8/60
                                                     717/172
2011/0010705 A1 *  1/2011 Adams .............. H04M 1/72406
                                                     726/4
2022/0319352 A1 * 10/2022 Gupta ............... H04M 1/72448

FOREIGN PATENT DOCUMENTS

CN          102681910  A        9/2012
CN          103713723  A        4/2014
CN          103744695  A        4/2014
CN          110321467  A       10/2019
CN          112911061  A   *    6/2021
TW            I221581          10/2004
TW            I251779  B        3/2006

* cited by examiner

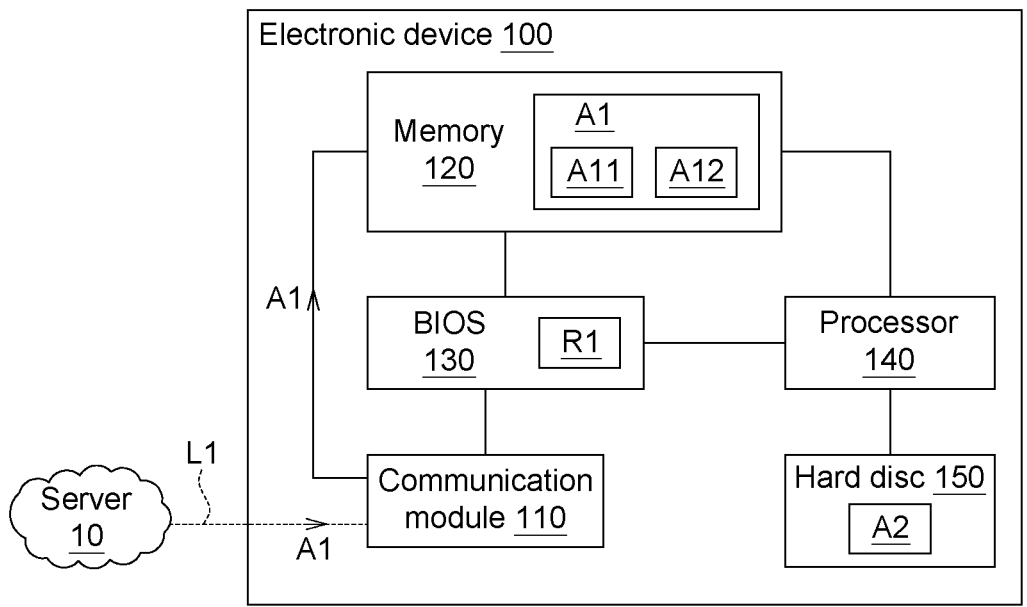

FIG. 1

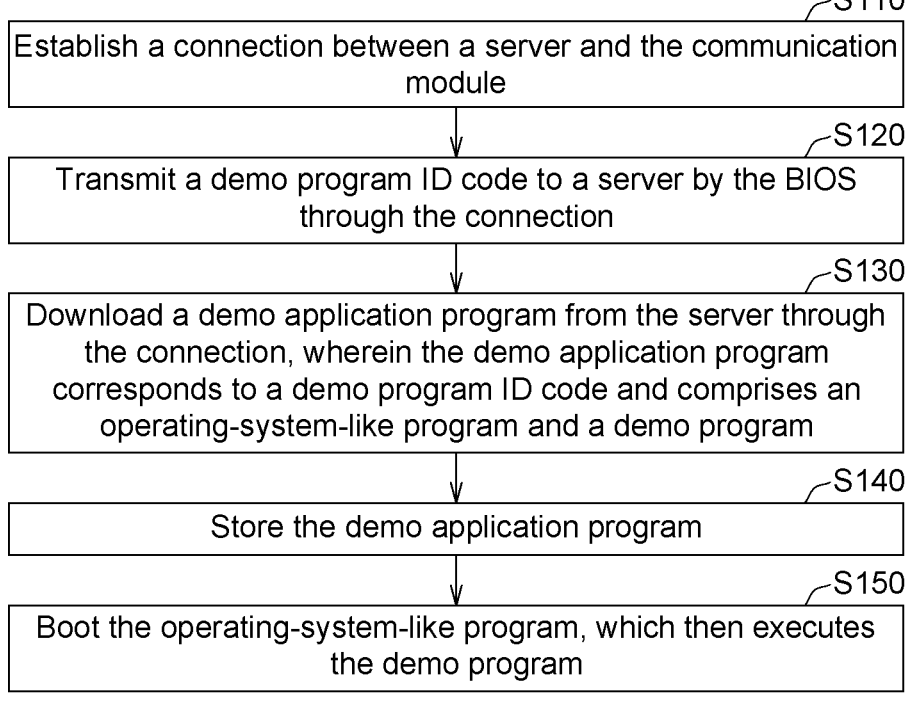

S110

Establish a connection between a server and the communication module

S120

Transmit a demo program ID code to a server by the BIOS through the connection

S130

Download a demo application program from the server through the connection, wherein the demo application program corresponds to a demo program ID code and comprises an operating-system-like program and a demo program

S140

Store the demo application program

S150

Boot the operating-system-like program, which then executes the demo program

FIG. 2

DEMO APPLICATION DOWNLOADED THROUGH CONNECTION COMPRISES OPERATING-SYSTEM-TYPE PROGRAM CORRESPONDING TO DEMO PROGRAM IDENTITY CODE

This application claims the benefit of Taiwan application Serial No. 111125684, filed Jul. 8, 2022, the subject matter of which is incorporated herein by reference.

BACKGROUND OF THE INVENTION

Field of the Invention

The invention relates in general to an electronic device and a demo program execution method.

Description of the Related Art

Conventionally, the demo of a computer at a physical shop is manually operated by a salesperson, who normally runs a demo program on the OS installed in a hard disc or plays a demo video. However, there are some problems with this demo method: when the exhibited computer is sold, the OS installed in the hard disc needs to be reset to factory settings, and such resetting takes time. Moreover, the downloading and updating of the demo program (or demo video) need to be processed manually. For instance, the salesperson needs to confirm whether an updated version of the demo program has been released or whether each model has its own demo program (or demo video). This also needs to be confirmed and processed manually. Therefore, it has become a prominent task for the industry to provide a new demo method to resolve the conventional problems disclosed above.

SUMMARY OF THE INVENTION

The present invention is directed to an electronic device and a demo program execution method capable of resolving the conventional problems disclosed above.

According to one embodiment of the present invention, an electronic device is provided. The electronic device includes a communication module, a memory and a basic input/output system (BIOS). The communication module is configured to establish a connection between a server and the communication module. The memory is configured to store a demo application program downloaded through the connection. The demo application program includes an operating-system-like program and a demo program, wherein the demo application program corresponds to a demo program ID code. The BIOS is configured to: transmit the demo program ID code a server and boot the operating-system-like program, wherein the operating-system-like program executes the demo program.

According to another embodiment of the present invention, a demo program execution method is provided. The demo program execution method includes the following steps: establishing a connection between a communication module and a server; transmitting a demo program ID code to a server by a BIOS through the connection; downloading a demo application program from the server by the BIOS through the connection, wherein the demo application program corresponds to a demo program ID code and the demo application program includes an operating-system-like program and a demo program; storing the demo application program to a memory; and, booting the operating-systemlike program by the BIOS, wherein the operating-system-like program executes the demo program.

The above and other aspects of the invention will become better understood with regard to the following detailed description of the preferred but non-limiting embodiment (s). The following description is made with reference to the accompanying drawings.

BRIEF DESCRIPTION OF THE DRAWINGS

FIG. 1 is a functional block diagram of an electronic device according to an embodiment of the present invention.

FIG. 2 is a flowchart of a demo program execution method of the electronic device of FIG. 1.

DETAILED DESCRIPTION OF THE INVENTION

Referring to FIG. 1, a functional block diagram of an electronic device 100 according to an embodiment of the present invention is shown. The electronic device 100 can be realized by a desktop computer, a notebook computer, a PC tablet, a smart phone or other types of electronic devices. The electronic device 100 includes a communication module 110, a memory 120, a basic input/output system (BIOS)130, a processor 140 and a hard disc 150. The communication module 110 is configured to establish a connection L1 between a server 10 and the communication module 110. The memory 120 is configured to store a demo application program A1 downloaded through the connection L1. The demo application program A1 includes an operating-system-like program A11 and a demo program A12, wherein the demo application program A1 corresponds to a demo program ID code R1. The BIOS 130 is configured to: transmit the demo program ID code R1 to the server 10 and boot the operating-system-like program A11, wherein the operating-system-like program A11 executes the demo program A12. In the present embodiment, the execution process of the demo program A12 is irrelevant with the data stored in the hard disc 150 and/or does not need to access or change the data stored in the hard disc 150.

The operating-system-like program A11 and the demo program A12 can be realized by program codes. The demo program ID code R1 includes at least one of a mobile network country code (MNCC) of the connection L1, a mobile network code (MNC) of the connection L1 and a machine ID code of the electronic device 100. After the connection L1 is established, the communication module 110 can obtain the MNCC and the MNC from the connection information of the connection L1. The machine ID code can be realized by a unique ID code, but the embodiments of the present invention are not limited thereto. In the embodiments of the present invention, the content and/or length of the machine ID code are not subject to any restrictions, and can be a serial number composed of numbers, letters or a combination thereof. Besides, the machine ID code can be stored in BIOS 130 and can be transmitted to the communication module 110 from the BIOS 130.

The language version of the demo program A12 is determined according to the MNCC and the MNC. In other words, the MNCC and the MNC can represent the region (or country) where the electronic device 100 is located. Depending on the region where the electronic device 100 is located, the server 10 can transmit the demo program A12 corresponding to the official language of the said region to the electronic device 100. Besides, the demo content of the demo program A12 is determined according to the machine ID code. In other words, the machine ID code corresponds to the demo content of the electronic device 100. Depending on the demo content of the electronic device 100, the server 10 can transmit the demo program A12 corresponding to the demo content to the electronic device 100. Since the machine ID code is a unique ID code, the probability of transmitting an erroneous demo program A12 can be greatly reduced. Also, the server 10 can pre-register the machine ID code of the electronic device 100 for identifying the electronic device 100, so that the demo program A12 corresponding to the machine ID code can be searched.

The communication module 110 can be realized by a wireless communication module, which can communicate with the server 10 using a suitable wireless communication protocol. The said wireless communication protocol can be realized by a communication protocol which supports Wi-Fi, Bluetooth, ZigBee, the fourth generation mobile communication technology (4G), the fifth generation mobile communication technology (5G) or other types of communication protocols. In another embodiment, the communication module 110 can also communicate with the server 10 through a transmission line (not illustrated). The communication module 110 can be realized by a built-in module of the electronic device 100 or an external communication module, such as a universal serial bus (USB) connection port that can be plugged into the electronic device 100.

The memory 120 can be realized by a random access memory (RAM). When the electronic device 100 is shutdown, the data of the memory 120 is automatically erased, so that there is no need to additionally delete the demo application program A1 stored in the memory 120. The memory 120 can create an RAM disk in which the demo application program A1 is stored. Besides, the BIOS 130 can create the RAM disk.

As indicated in FIG. 1, the BIOS 130 can perform an initial setting on the electronic device 100, wherein the initial setting includes driving the communication module 110 to establish the connection L1 with the server 10 and downloading a demo application program A1. The said initial setting can be realized by a built-in firmware of the BIOS 130. For instance, after the electronic device 100 is booted, the BIOS 130 drives the communication module 110 to establish the connection L1 and control the communication module 110 to transmit the demo program ID code R1 to the server 10. After receiving the demo program ID code R1, the server 10 transmits the demo application program A1 corresponding to the demo program ID code R1 to the communication module 110. After receiving the demo application program A1, the communication module 110 transmits the demo application program A1 to be stored in the memory 120. In an embodiment, the communication module 110 can transmit the demo application program A1 to the memory 120 directly or through the BIOS 130.

As indicated in FIG. 1, the processor 140 can be realized by a central processing unit (CPU). In an embodiment, after the BIOS 130 boots the operating-system-like program A11 (then the control right is passed to the operating-system-like program A11), the processor 140 can load in the operating-system-like program A11 and execute the actions pre-set by the operating-system-like program A11.

As indicated in FIG. 1, the hard disc 150 can be realized by a mechanic hard disc driver (HDD) or a solid-state disc (SSD). The hard disc 150 can be a built-in hard disc of the electronic device 100 or an external hard disc that can be plugged into the electronic device 100 via a USB connection port for instance. The hard disc 150 can store an operating system (OS) A2. Since the OS A2 is not booted during the execution process of the demo program A12, the OS A2 installed in the hard disc 150 is not used, and there is no need to restore the initial setting (factory settings) of the OS A2 and no extra labor will be spent on the restoration of factory settings.

The OS A2 is a set of system software programs which govern and control and computer operations, use and execute hardware and software resources, and provide public utilities to organize interactions and interactive association with the user. The OS A2 serves as the core and cornerstone of the computer system. The OS needs to process and configure the memory, determines the priorities of the supply of system resources, control the I/O device, operate the network and manage file systems. The OS also provides an operation interface through which the user can interact with the system. In an embodiment, the OS A2 can be a conventional OS, such as WINDOWS, but the said exemplification is not for limiting the embodiments of the present invention.

In comparison to the OS A2, the operating-system-like program A11 mainly is used to execute the demo program A12. Since there is no direct relationship between the OS A2 and the operating-system-like program A11, the OS A2 and the operating-system-like program A11 can be operate operated independently and do not need to transmit data to each other during operation. Therefore, in another embodiment, the electronic device 100 can dispense with the hard disc 150 and the OS A2.

Referring to FIG. 2, a flowchart of a demo program execution method of the electronic device 100 of FIG. 1 is shown.

In step S110, a connection L1 between a communication module 110 and a server 10 is established. For instance, when the electronic device 100 is booted, the BIOS 130 can drive the communication module 110 to establish a connection L1 with the server 10.

In step S120, a demo program ID code R1 is transmitted to the server 10 by the BIOS 130 through the connection L1. The demo program ID code R1 includes a mobile network country code (MNCC) of the connection L1, a mobile network code (MNC) of the connection L1 and a machine ID code of the electronic device 100. The machine ID code can be realized by a unique ID code, but the embodiments of the present invention are not limited thereto. In the embodiments of the present invention, the content and/or length of the machine ID code are not subject to any restrictions, and can be a serial number composed of numbers, letters or a combination thereof.

In step S130, a demo application program A1 is downloaded from the server 10 by the BIOS 130 through the connection L1, wherein the demo application program A1 corresponds to a demo program ID code R1 and includes an operating-system-like program A11 and a demo program A12.

The language version of the demo program A12 is determined according the MNCC and the MNC. In other words, the MNCC and the MNC can represent the region (or country) where the electronic device 100 is located. Depending on the region where the electronic device 100 is located, the server 10 can transmit the demo program A12 corresponding to the official language of the said region to the electronic device 100. Besides, the demo content of the demo program A12 is determined according to the machine ID code. In other words, the machine ID code corresponds to the demo content of the electronic device 100. Depending on the demo content of the electronic device 100, the server 10 can transmit the demo program A12 corresponding to the demo content to the electronic device 100. Since the machine ID code is a unique ID code, the probability of transmitting an erroneous demo program A12 can be greatly reduced. Also, the server 10 can pre-register the machine ID code of the electronic device 100 for identifying the electronic device 100, so that the demo program A12 corresponding to the machine ID code can be searched.

In step S140, the demo application program A1 is stored in the memory 120. For instance, after receiving the demo application program A1, the communication module 110 transmits the demo application program A1 to be stored in the memory 120. In an embodiment, the communication module 110 can transmit the demo application program A1 to the memory 120 directly or through the BIOS 130.

In step S150, the operating-system-like program A11 is booted by the BIOS 130, and the demo program A12 is executed by the operating-system-like program A11. In an embodiment, the BIOS 130 boots the operating-system-like program A11 without executing the OS A2 stored in a hard disc 150, and the data stored in the hard disc 150 is not used or changed during the execution process of the demo program A12. Thus, there is no need to restore the initial setting (factory settings) of the OS A2 and no extra labor will be spent on the restoration of factory settings.

In an embodiment, steps S110-S150 can be automatically performed after the electronic device 100 is booted. In another embodiment, after the electronic device 100 is booted, a user command (not illustrated) can be inputted to the electronic device 100, and the BIOS 130 responds to the user command and performs steps S110-S150. The said user command can be a hot key command inputted to the keyboard or a touch command inputted to the touch panel.

Other technical features of the demo program execution method of the electronic device 100 are already disclosed above and are not repeated here.

To summarize, an electronic device and a demo program execution method are provided in the embodiments of the present invention. A demo application program is downloaded from a server by a BIOS, and after the demo application program is downloaded, an operating-system-like program of the demo application program is booted, wherein the operating-system-like program executes the demo program. The process from the booting of the electronic device to the execution of the demo program is executed automatically or according to a user command. Since the data stored in the hard disc is not used or changed during the execution process of the demo program, there is no need to restore the initial setting (factory settings) of the hard disc.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device, comprising:
a communication module configured to establish a connection between a server and the communication module;
a memory configured to store a demo application program downloaded through the connection, wherein the demo application program comprises an operating-systemlike program and a demo program, and the demo application program corresponds to a demo program ID code; and
a basic input/output system (BIOS) configured to:
transmit the demo program ID code to the server; and
boot the operating-system-like program, wherein the operating-system-like program executes the demo program;
wherein there is no direct relationship between an operating system (OS) and the operating-system-like program, the OS and the operating-system-like program is operated independently and do not need to transmit data to each other during operation.

2. The electronic device according to claim 1, further comprising:
a hard disc configured to store the OS operating system (OS), wherein the OS is irrelevant with the operating-system-like program.

3. The electronic device according to claim 1, wherein the memory is a random access memory (RAM).

4. The electronic device according to claim 1, wherein the demo program ID code comprises at least one of a mobile network country code (MNCC) of the connection, a mobile network code (MNC) of the connection and a machine ID code of the electronic device.

5. The electronic device according to claim 4, wherein the language version of the demo program is determined according to the MNCC and the MNC.

6. The electronic device according to claim 4, wherein the demo content of the demo program is determined according to the machine ID code.

7. The electronic device according to claim 4, wherein the machine ID code is an unique ID code.

8. A demo program execution method, comprising:
establishing a connection between a communication module and a server;
transmitting a demo program ID code to a server by the BIOS through the connection;
downloading a demo application program from the server by the BIOS through the connection, wherein the demo application program corresponds to a demo program ID code and comprises an operating-system-like program and a demo program;
storing the demo application program to a memory; and
booting the operating-system-like program by the BIOS, wherein the operating-system-like program executes the demo program;
wherein there is no direct relationship between an OS and the operating-system-like program, the OS and the operating-system-like program is operated independently and do not need to transmit data to each other during operation.

9. The demo program execution method according to claim 8, further comprising:
booting the operating-system-like program without executing the OS stored under of a hard disc.

10. The demo program execution method according to claim 8, wherein the a random access memory (RAM).

11. The demo program execution method according to claim 8, wherein the demo program ID code comprises at least one of a mobile network country code (MNCC) of the connection, a mobile network code (MNC) of the connection and a machine ID code of the electronic device.

12. The demo program execution method according to claim 11, wherein the language version of the demo program is determined according to the MNCC and the MNC.

13. The demo program execution method according to claim 11, wherein the demo content of the demo program is determined according to the machine ID code.

14. The demo program execution method according to claim 11, wherein the machine ID code is a unique ID code.

* * * * *